US011188969B2

(12) United States Patent
Trim et al.

(10) Patent No.: US 11,188,969 B2
(45) Date of Patent: Nov. 30, 2021

(54) DATA-ANALYSIS-BASED VALIDATION OF PRODUCT REVIEW DATA AND LINKING TO SUPPLY CHAIN RECORD DATA

(71) Applicant: INTERNATIONAL BUSINESS MACHINES CORPORATION, Armonk, NY (US)

(72) Inventors: Craig M. Trim, Ventura, CA (US); Nadiya Kochura, Bolton, MA (US); Shikhar Kwatra, Durham, NC (US); Tiberiu Suto, Franklin, NY (US); Adam Lee Griffin, Dubuque, IA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/856,075

(22) Filed: Apr. 23, 2020

(65) Prior Publication Data
US 2021/0334876 A1    Oct. 28, 2021

(51) Int. Cl.
*G06Q 30/00*    (2012.01)
*G06Q 30/06*    (2012.01)
(Continued)

(52) U.S. Cl.
CPC ..... *G06Q 30/0631* (2013.01); *G06F 16/2365* (2019.01); *G06F 16/2379* (2019.01);
(Continued)

(58) Field of Classification Search
None
See application file for complete search history.

(56) References Cited

U.S. PATENT DOCUMENTS 9,870,591 B2    1/2018  Shah
10,212,145 B2   2/2019  Chavez et al.
(Continued)

FOREIGN PATENT DOCUMENTS

AU    2018-101669 A4    12/2018

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
(Continued)

*Primary Examiner* — Mila Airapetian
(74) *Attorney, Agent, or Firm* — Michael A. Petrocelli, Esq.; Kevin P. Radigan, Esq.; Heslin Rothenberg Farley & Mesiti P.C.

(57) ABSTRACT

Data-analysis-based validation of product review data and linking to product record data are provided to facilitate forwarding product-related guidance. The processing includes one or more processors obtaining record data documenting, at least in part, a product's specific supply chain history, and receiving by the processor(s) review data for the product. Based on data analysis, the processor(s) authenticates the review data of the product to establish verified review data, and links the verified review data to the record data documenting, at least in part, the product's supply chain history. The processor(s) provides to a user product-related guidance based, at least in part, on the verified review data for the product that has been linked to the record data documenting, at least in part, the product's supply chain history.

19 Claims, 12 Drawing Sheets

(51) Int. Cl.
*G06Q 10/08* (2012.01)
*G06Q 30/02* (2012.01)
*G06Q 10/10* (2012.01)
*G06F 16/23* (2019.01)
*G06F 40/205* (2020.01)
*G06Q 10/06* (2012.01)

(52) U.S. Cl.
CPC ......... *G06F 40/205* (2020.01); *G06Q 10/087* (2013.01); *G06Q 10/10* (2013.01); *G06Q 30/0185* (2013.01); *G06Q 30/0282* (2013.01); *G06Q 30/0627* (2013.01); *G06Q 30/0629* (2013.01); *G06Q 10/06395* (2013.01)

(56) References Cited

U.S. PATENT DOCUMENTS

| | | | |
|---|---|---|---|
| 10,380,812 | B2 | 8/2019 | Pickover et al. |
| 10,467,586 | B2 | 11/2019 | Fuller et al. |
| 2009/0307032 | A1* | 12/2009 | Tribe ............... G06Q 10/08 705/7.38 |
| 2014/0201094 | A1* | 7/2014 | Herrington ........ G06Q 30/018 705/317 |
| 2018/0018723 | A1 | 1/2018 | Gaurav et al. |
| 2018/0114261 | A1 | 4/2018 | Jayachandran |
| 2018/0117446 | A1* | 5/2018 | Tran ............... A42B 3/0433 |
| 2018/0157825 | A1 | 6/2018 | Eksten et al. |
| 2018/0189449 | A1 | 7/2018 | Karumba et al. |
| 2018/0315055 | A1 | 11/2018 | Pickover et al. |
| 2018/0349968 | A1 | 12/2018 | O'Brien et al. |
| 2018/0357365 | A1* | 12/2018 | Meadow ............... G16B 30/00 |
| 2018/0357683 | A1 | 12/2018 | Pickover et al. |
| 2018/0374283 | A1 | 12/2018 | Pickover et al. |
| 2019/0147397 | A1* | 5/2019 | Hodges ............. G06Q 10/0833 705/333 |
| 2019/0158270 | A1 | 5/2019 | Berti |
| 2019/0333169 | A1 | 10/2019 | Povar et al. |
| 2021/0097480 | A1* | 4/2021 | Beier ................. G06Q 10/087 |

OTHER PUBLICATIONS

Kundu et al., "Collaborative and Accountable Hardware Governance Using Blockchain", 2018 IEEE 4th International Conference on Collaboration and Internet Computing (CIC), Sep. 2018 (pp. 114-121).

Anonymous, "Managing Product Identifiers Using a Distributed Ledger or Blockchain", IP.com Disclosure No. IPCOM000255269D, published Sep. 13, 2019 (9 pages).

Columbus, Louis, "How Blockchain Can Improve Manufacturing in 2019", Forbes Magazine, published on-line Oct. 28, 2018 (7 pages).

Barlow, Jeanette, "Innovvating in Supply Chain with AI and Blockchain", Watson Customer Engagement, published on-line Dec. 12, 2018 (2 pages).

Xu et al., "Electronics Supply Chain Integrity Enabled by Blockchain", ACM Transactions on Design Automation of Electronic Systems, vol. 24, No. 3, Art. 31, May 2019 (25 pages).

* cited by examiner

DATA-ANALYSIS-BASED VALIDATION OF PRODUCT REVIEW DATA AND LINKING TO SUPPLY CHAIN RECORD DATA

BACKGROUND

In today's economic marketplace, many consumers depend on reviews for determining which products to purchase. There are certain disadvantages to current review platforms, however, that limit their usefulness and accuracy for this purpose. On many review platforms, it is not possible for a potential consumer to independently and transparently verify that the review was left by a validator who is a genuine purchaser and/or user of the product reviewed.

Additionally, the potential consumer is unable today to independently and transparently determine that the product reviewed contains the same components as the product being offered for sale and being considered for purchase. For instance, if an individual is considering buying a product model number ABC123, it is possible that certain components within the product may have been changed out after a review for the product has been posted. The changed components may not be from the same manufacturer, or be of the same quality, source, etc., which could ultimately impact the longevity, functionality, quality, and/or overall reviews for product model number ABC123.

SUMMARY

Certain shortcomings of the prior art are overcome and additional advantages are provided through the provision, in one or more aspects, of a computer-implemented method, which includes obtaining, by one or more processors, record data documenting, at least in part, a product's supply chain history, and receiving, by the one or more processors, review data for the product. Based on data analysis, the one or more processors authenticate the review data of the product to establish verified review data, and link the verified review data to the record data documenting, at least in part, the product's supply chain history. Further, the computer-implemented method includes providing to a user, by the one or more processors, product-related guidance based, at least in part, on the verified review data for the product that has been linked to the record data documenting, at least in part, the product's supply chain history.

Systems and computer program products relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
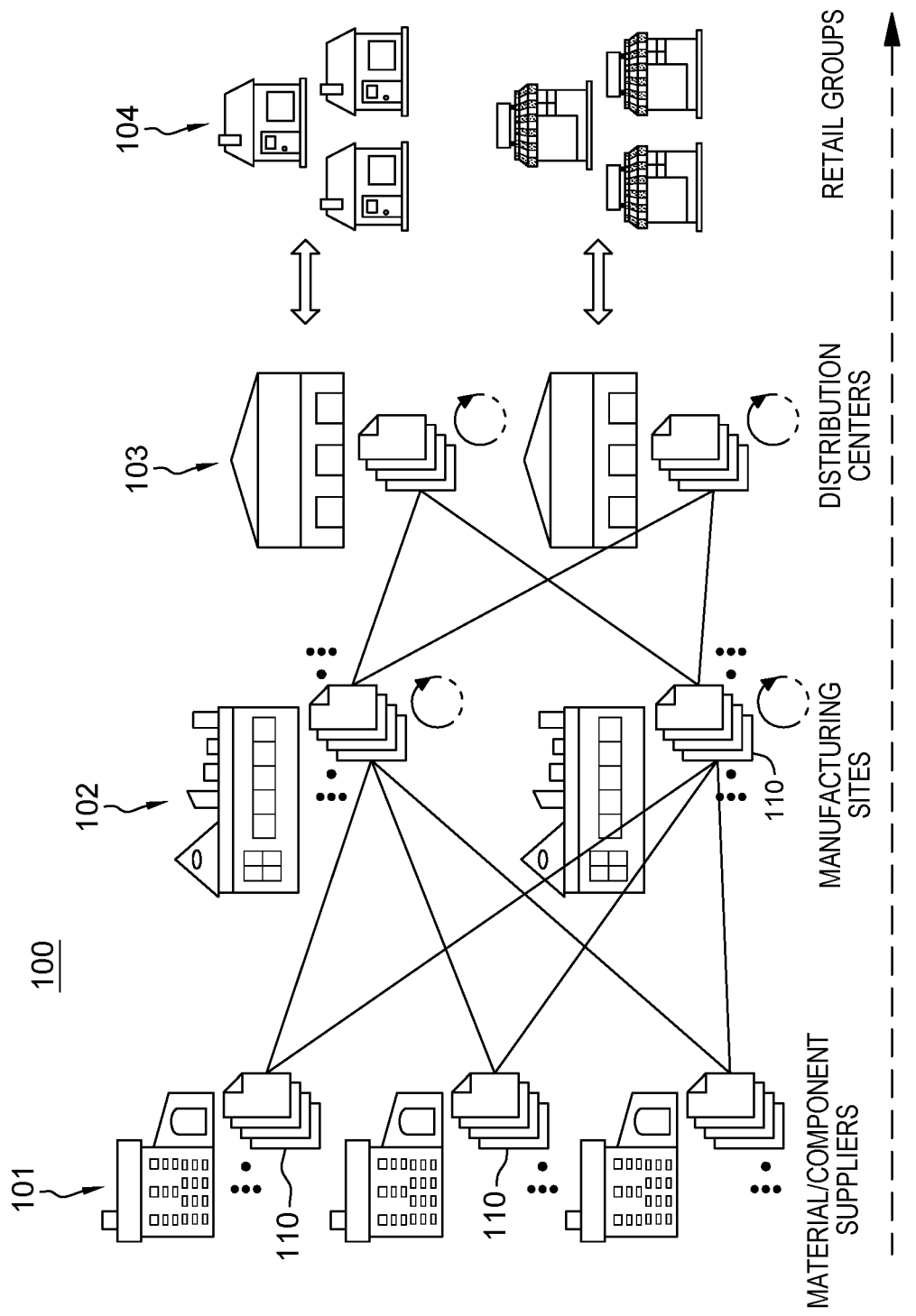
FIG. 1 depicts one embodiment of one or more product supply chains, and documenting thereof as record data, such as a blockchain record, for use in accordance with one or more aspects of the present invention.

The accompanying figures, in which like reference numerals refer to identical or functionally similar elements through the separate views, and which are incorporated in and form a part of this specification, further illustrate the present invention and, together with the detailed description of the invention, serve to explain aspects of the present invention. Note in this regard that descriptions of well-known systems, devices, processing techniques, etc., are omitted so as not to unnecessarily obscure the invention in detail. It should be understood, however, that the detailed description and the specific example(s), while indicating aspects of the invention, are given by way of illustration only, and not limitation. Various substitutions, modifications, additions, and/or other arrangements, within the spirit or scope of the underlying inventive concepts, will be apparent to those skilled in the art from this disclosure. Note further that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 3:
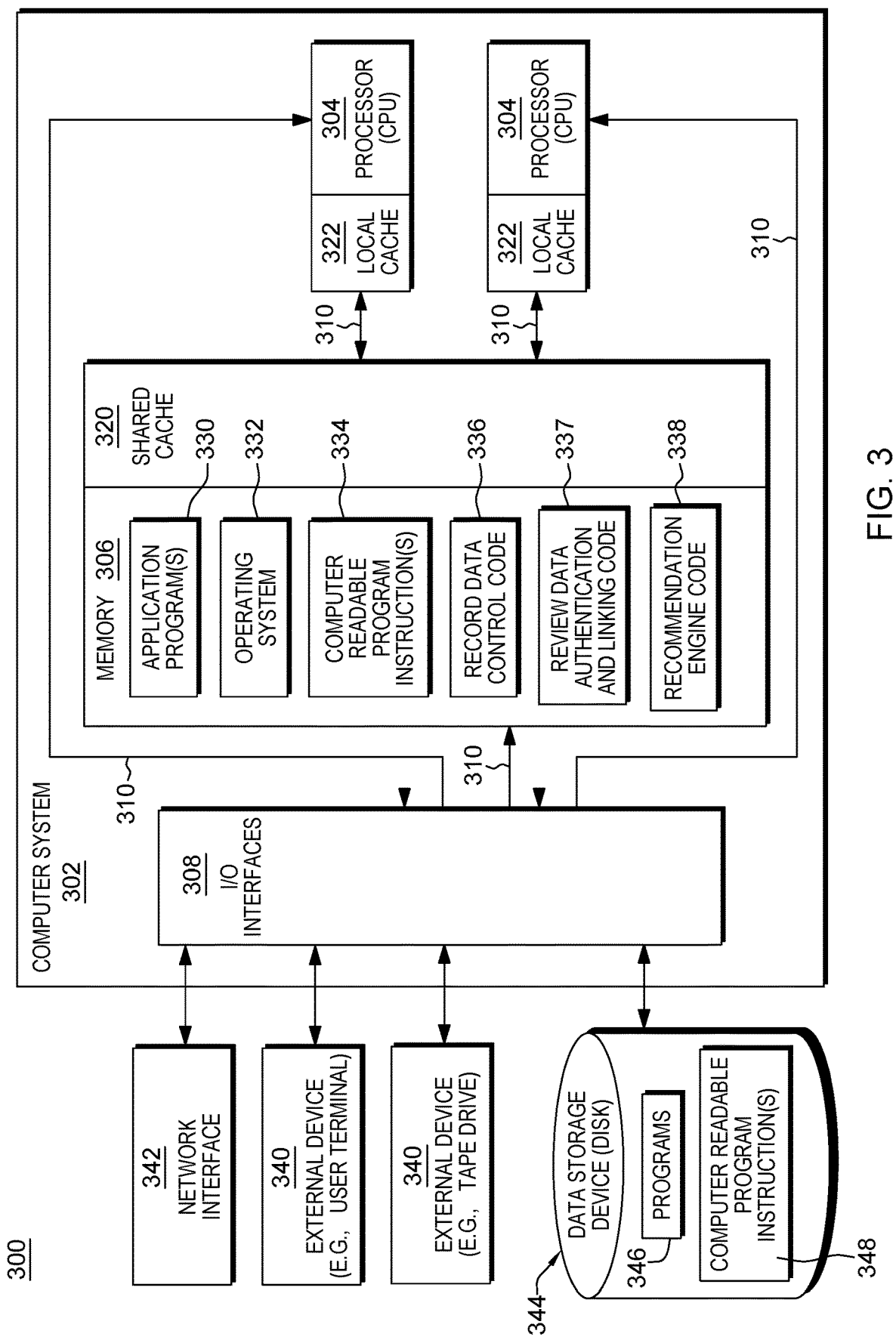
FIG. 3 depicts a block diagram of one embodiment of a computing node, or data processing system, to implement processing, in accordance with one or more aspects of the present invention.

As understood by one skilled in the art, program code, as referred to in this application, can include both software and hardware. For example, program code in certain embodiments of the present invention can include fixed function hardware, but other embodiments can utilize a software-based implementation of the functionality described. Certain embodiments combine both types of program code. One example of program code, also referred to as one or more programs or program instructions, is depicted in FIG. 3 as computer-readable program instructions 334, as well as application programs 330, record data control code 336, review data authentication code 337, and recommendation engine code 338, one or more of which can be stored in memory 306 of computer system 302. Further examples include programs 346 and computer-readable program instruction(s) 348 in data storage device 344 of FIG. 3.

As noted, in today's economic marketplace, many consumers rely on reviews for determining which products to purchase. There are certain disadvantages to current review platforms, however, that limit their usefulness and accuracy for this purpose. For instance, on many review platforms, it is not possible for a potential consumer to independently and transparently verify that the review was left by a validator who is a genuine purchaser and user of the product reviewed.

Additionally, it is not possible to independently and transparently determine that the product reviewed contains the same components as the product being offered for sale and being considered for purchase. For instance, if an individual buys a product model number ABC123, certain components within the product may have been changed out based on availability from the supplier. If a component is unavailable, then the manufacturing process typically does not stop. Rather, the manufacturer often selects a secondary supplier to ensure production continues, and the new supplier will provide the component needed to complete the build. However, that component may not be from the same manufacturer, or be of the same quality, source, etc., which could ultimately impact the longevity, functionality, quality, and overall reviews for product model number ABC123. Currently, there is no way for the potential consumer to compare any supply chain differences between the reviewed product model number ABC123, and the currently available product number ABC123. Although both are the same type of product, and even have the same model number, there may be differences in the respective source, manufacturing and/or distribution supply chains, which could affect longevity, functionality, quality, etc., of one product in comparison to the other.

In addition, with current review platforms, it can be difficult for an entity within the product supply chain ecosystem to identify and make desirable changes to the product, or modifications to the supply chain, based on today's review feedback, where there may be multiple supply chain variants of the product being sold.

Disclosed herein are computer-implemented methods, systems and computer program products that include program code executing on one or more processors which authenticates or validates third party review data and links the verified review data to the specific record data documenting the supply chain of the product being reviewed. This augmented product component tracking and correlation via a trusted third party validation system(s) facilitates providing recommendations and taking dynamic actions based on the verified review data and different products' supply chains. Embodiments disclosed herein advantageously enable consumers, to have a much higher level of trust and confidence in the review data, as well as a product's authenticity that is correlated to the review data. In addition, manufacturers benefit in one aspect from embodiments of the present invention by, for instance, preventing review data from older product versions possibly having a negative influence on newer product versions, such as newer product versions designed to address a specific issue (e.g., model number XYZ1 versus model number XYZ2, or software release 123.1 versus software release 123.7).

Embodiments of the present invention result in a provenance knowledge base, and analysis across the entire history graph reveals insight into product components and manufacturing processes. The analysis is not limited to a single product, and its component parts. Rather, an element or component can exist in one product, and also in another product, with both products potentially being otherwise unrelated. However, if a similar usage profile exists (for instance, operation in certain climates or under certain conditions), and there is a component-wise failure in one product, then it is possible for a similar collapse of the component in the other product. Data analysis disclosed herein is expandable to all parts and combination of parts across products to advantageously provide product-related guidance to potential consumers, as well as to manufacturers, or other entities in the product supply chain ecosystem, to take action, such as making better selections and/or to better refine the product, the supply or manufacturing process for the product, and/or its supply chain.

To summarize, embodiments of the present invention include a computer-implemented method, system and computer program product for data-analysis-based verification of product review data and linking to supply chain record data, where program code executing on one or more processors obtains record data documenting, at least in part, a product's supply chain history, and receives review data for the product, such as from a validator or owner of the product. Based on data analysis, the program code executing on one or more processors authenticates the review data for the product to establish verified review data, and links the verified review data to the record data documenting, at least in part, the product's supply chain history. Embodiments of the present invention also include program code executing on one or more processors that provides to a user, such as a potential consumer, or a manufacturer associated with the supply chain, product-related guidance based, at least in part, on the verified review data for the product that has been linked to the record data documenting, at least in part, the product's supply chain history. In one or more implementations, the product-related guidance depends on the particular user. For instance, where the user is a consumer, the product-related guidance can be, or include, the verified review data, and where the user is a supply chain entity, such as the manufacturer of the product, the product-related guidance can be, or include, one or more recommendations related to the product, the manufacturing process for the product, and/or the product's supply chain. In one or more embodiments, the recommendations can be generated by a cognitive recommendation engine which includes a machine learning agent, such as described herein. Note also that in one or more embodiments, the record data is, or includes, a blockchain record that documents, at least in part, the product's supply chain history.

In one or more embodiments of the present invention, program code executing on one or more processors receives other record data documenting, at least in part, another product's supply chain history, where the product and the other product are a same type of product, and compares the record data of the product and the other record data of the other product to confirm that the product and the other product contain identical components, and further provides to the user an indication that the product and the other product contain the identical components.

In one or more embodiments, program code executing on one or more processors receives other record data documenting, at least in part, another product's supply chain history, compares the record data of the product and the other record data of the other product to identify one or more supply chain differences between the product and the other product, and provides the supply chain difference(s) to the user. In certain embodiments of the present invention, the one or more supply chain differences between the product and the other product include one or more component differences between the product and the other product, where the product and the other product each include multiple components.

In one or more embodiments, the record data includes product component details, and the program code executing on one or more processors analyzes the verified review data via natural language processing to identify based thereon a component of the product relevant, at least in part, to the verified review data, and provides an indication to the user of the identified component of the product relevant to the verified review data. In certain embodiments, the program code executing on one or more processors receives other record data documenting, at least in part, another product's supply chain history, where the product and the other product are different types of products, and compares the record data of the product and the other record data of the other product to confirm that the identified component is common between the product and the other product, and provides to the user an indication that the identified component is common between the product and the other product.

In one or more embodiments, the user is a manufacturer of the product, the verified review data is provided by an end-user of the product, and the program code executing on the one or more processors parses the verified review data using natural language processing and generate based thereon feedback guidance to the manufacturer specific to one or more aspects of the product's supply history. In certain embodiments of the present invention, the feedback guidance includes one or more recommendations to the manufacturer pertaining the product's supply chain history, where the one or more recommendations are based, at least in part, on the verified review data for the product.

In one or more embodiments, the blockchain record includes ownership data for the product, and the program code executing on the one or more processors authenticates the review data by comparing identity data of a validator providing the review data to the ownership data for the product to authenticate the validator, and thereby verify the review data.

Embodiments of the present invention are inextricably tied to computing and provide significantly more than existing approaches to providing and using product review data. For instance, embodiments of the present invention provide program code executing on one or more processors to exploit the interconnectivity of various systems, as well as to utilize various computing-centric data analysis and handling techniques, in order to authenticate review data of a product to establish verified review data, and link the verified review data to obtained record data documenting, at least in part, the product's supply chain history, and provide to a user product-related guidance based, at least in part, on the verified review data for the product that has been linked to the record data documenting, at least in part, the product's supply chain history. Both the interconnectivity of the devices and/or computing systems utilized, and the computer-exclusive data processing techniques utilized by the program code, enable various aspects of the present invention. Further, embodiments of the present invention provide significantly more functionality than existing approaches to providing product review data to, for instance, potential consumers, as well as feedback to product manufacturers.

In embodiments of the present invention, program code executing on one or more processors provides significantly more functionality, including but not limited to: 1) program code that obtains record data documenting, at least in part, a product's supply chain history; 2) program code that receives review data for the product; 3) program code that, based on data analysis, authenticates the review data of the product to establish verified review data; 4) program code that, based on data analysis, links the verified review data to the record data documenting, at least in part, the product's supply chain history; and 5) program code that provides to a user product-related guidance based, at least in part, on the verified review data for the product that has been linked to the record data documenting, at least in part, the product's specific supply chain history.

As illustrated in FIG. 1, in the course of commerce, products (goods, materials, etc.) can pass from multiple source or supplier entities 101, to multiple manufacturing entities 102, to multiple distribution entities 103, to an end-user or consumer who purchased, for instance, the product through one of multiple retail entities 104. The specific series of source, manufacturing, transportation, distribution and retail entities involved with the product is commonly referred to as the supply chain 100 of the product. As product can change hands multiple times within its supply chain, and be incorporated into other products, etc., techniques to verify the quality and genuineness of the product can usefully be maintained along the supply chain. For instance, a buyer of a product along the supply chain can find it useful to verify properties such as, for instance, content, sourcing, provenance, regulation adherence, etc.

Recent developments in supply chain management have led to implementations of blockchain records 110 for supply chain integrity assurance. Blockchain is a distributed method of managing a single immutable ledger of verified transactions. A blockchain ledger (interchangeably referred to herein as a "blockchain" or "ledger") is decentralized, i.e., no single central authority is in control of the ledger entries or updates, rather, a network of authorized members share and verify the records, or blocks, that are to be added to the ledger. Once added, a block is immutable, i.e., cannot be changed or deleted, before a block is committed to the ledger, blockchain technology allows one or more verifications to be computed and applied to the block, and only upon a satisfactory number and/or types of verification can a block become a part of the ledger.

A block is uniquely identifiable in the ledger by an identifier associated with the block, where the block identifier is unique within the ledger. Unless a block is last in a branch in the ledger, each block is connected to a previous block and a next block. Therefore, the blockchain allows verification of the history of a transaction recorded in the particular block by providing access to the previous and next blocks as far as needed, up and down the ledger branches.

A variety of blockchain-based supply chain management solutions can be implemented to provide integrity management, such as using tags to avoid counterfeiting, utilizing sensed data and records of each point of transaction, billing contracts for various components, stock-keeping unit (SKU) stamps, similar product identifiers, material analysis, and/or other data to record transactions at different points in the supply chain, and their relevant sub-components.

Figure 2:
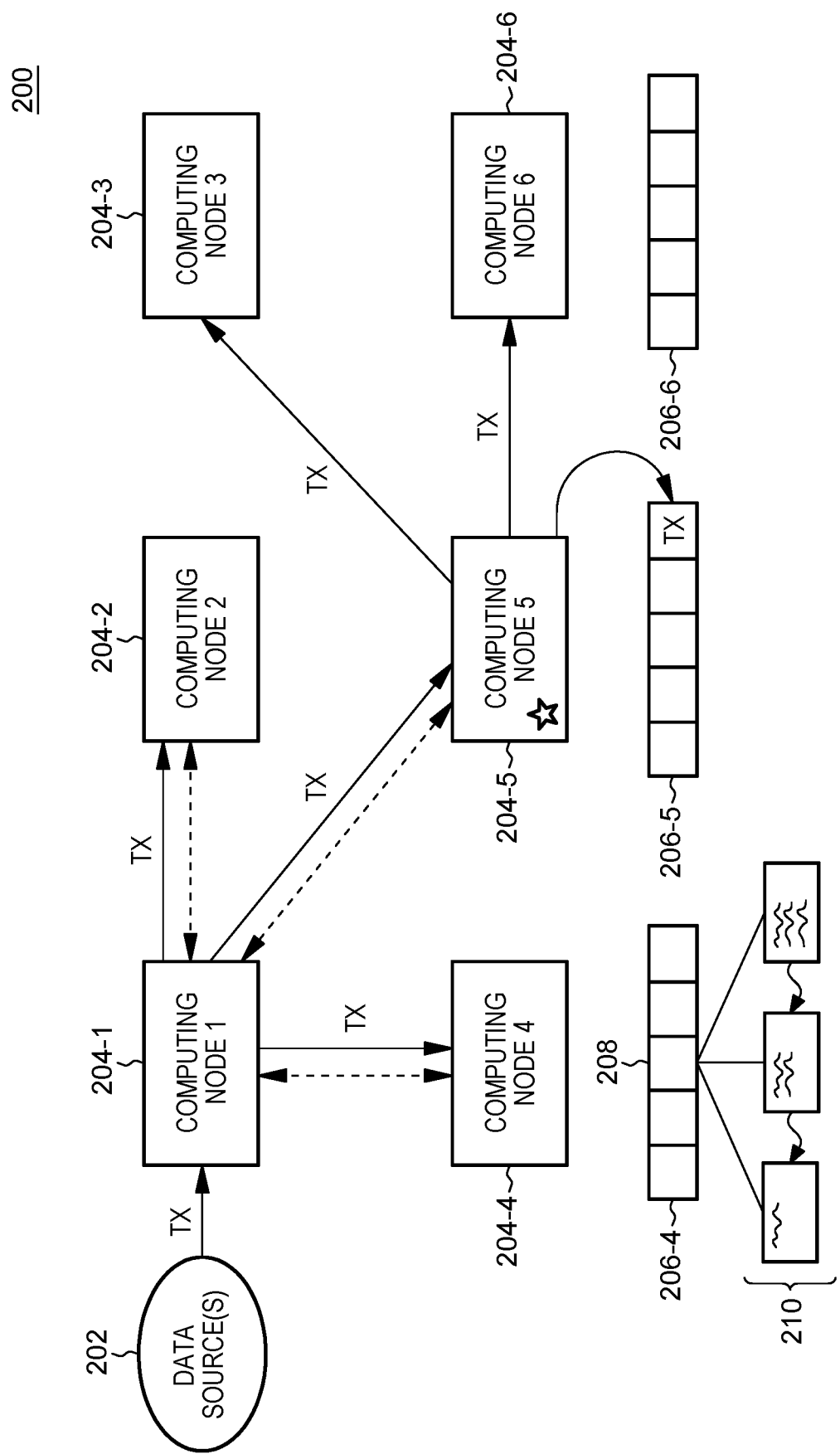
FIG. 2 depicts one embodiment of a system for computing a record, such as a blockchain record, for use in accordance with one or more aspects of the present invention.

FIG. 2 illustrates a blockchain computational system 200 with which one or more embodiments of the invention can be implemented. As shown, system 200 includes one or more data or transaction sources 202 operatively coupled to at least one of a plurality of distributed peer computing nodes 204-1, 204-2, . . . , 204-6. System 200 can have more or less computing nodes than illustrated in FIG. 2. Each computing node in system 200 can be a computing system or data processing system configured to maintain a blockchain, which as noted, is a cryptographically secured (via a cryptographic hash function) record or ledger of data blocks that represent respective transactions within the monitored environment. A cryptographic hash function is a cryptographic function which takes an input (or "message") and returns a fixed-size alphanumeric string, which is called the hash value (sometimes called a message digest, a digital fingerprint, a digest, or a checksum).

In FIG. 2, computing nodes 204-4, 204-5, and 204-6 are shown each maintaining the same blockchain (respectively illustrated as blockchains 206-4, 206-5, and 206-6). Although not expressly shown, each computing node in system 200 is configured to be able to maintain this same blockchain. Each blockchain is a growing list of data records hardened against tampering and revision (i.e., secure). Each block in the blockchain (illustratively referenced as block 208 in blockchain 206-4) holds batches of one or more individual transactions and the results of any blockchain executables (e.g., computations that can be applied to the transactions). Each block typically contains a timestamp and information linking it to a previous block. More particularly, each subsequent block in the blockchain (e.g., 206-4, 206-5, 206-6, etc.) is a data block that includes a given transaction and a hash value of the previous block in the chain (i.e., the previous transaction). The current transaction and the hash value of the prior transactions can itself be hashed to generate a hash value. Thus, each data block in the blockchain represents a given set of transaction data plus a set of all previous transaction data (e.g., as illustratively depicted as 210 in FIG. 2).

Assume a new set of transaction data (new transaction TX) is obtained from one of the one or more data sources 202, and received by computing node 1 (204-1). Computing node 1 (204-1) can provide the new transaction TX to all or a subset of computing nodes in system 200. In this case, transaction data TX is sent to computing node 2 (204-2), computing node 4 (204-4), and computing node 5 (204-5).

Note that computing node 204-5 is marked with a star symbol to denote it as a leader in a consensus protocol. That is, the computing nodes in the system 200 each are configured to participate in a consensus protocol as peers with one peer being designated as a leader. Any peer can assume the role of leader for a given iteration of the consensus protocol. In general, the leader receives all transactions from the participating peers in the system and creates a new block for the new transaction. The new block is sent out by the leader node to one or more of the other peer computing nodes (e.g., 204-3 and 204-6 as illustrated in FIG. 2) which double check (validate) that the leader computed the new block properly (i.e., the validating nodes agree by consensus). If consensus is reached, then the computing nodes in system 200 add the new block to the blockchain they currently maintain. As a result, after the new transaction TX is processed by the system 200, each computing node should now have a copy of the same updated blockchain stored in its memory. Then, when a new transaction comes into the system 200, the above-described process of adding the transaction to the blockchain is repeated.

It is to be understood that any single computing node may itself serve as the receiver, validator, and block generator for of new transaction data set. However, in the context of a consensus protocol, the more nodes that validate the given transaction, the more trustworthy the data block is considered.

It is to be further understood that the above description represents one illustrative blockchain computation process and that embodiments of the invention are not limited to the above or any particular blockchain computation implementation. As such, other appropriate cryptographic processes can be used to maintain and add to a secure chain of data blocks in accordance with embodiments of the invention. Further, although described herein with reference to a blockchain record or blockchain-backed supply-chain monitoring, the record data documenting, at least in part, the product's specific supply chain history can be assembled and protected using any desired transaction ledger technique.

Advantages of a blockchain computational system include, but are not limited to: (1) the ability for independent nodes to converge on a consensus of a latest version of a large data set (e.g., a ledger), even when the nodes are run anonymously, have poor interconnectivity and may have operators who are dishonest or otherwise malicious; (2) the ability for any well-connected node to determine, with reasonable certainty, whether a transaction does or does not exists in the data set; (3) the ability for any node that creates a transaction to, after a confirmation period, determine with a reasonable level of certainty whether the transaction is valid, able to take place, and become final (i.e., that no conflicting transactions were confirmed into the blockchain elsewhere that would invalidate the transaction); (4) a prohibitively high cost to attempt to rewrite or otherwise alter transaction history; and (5) automated conflict resolution that ensures that conflicting transactions never become part of the confirmed data set.

Illustrative embodiments adapt the blockchain computational system 200 of FIG. 2 to monitor, manage and document data associated with a product's supply chain. More particularly, in non-limiting, illustrative embodiments, blockchain technology is applied to track and append data associated with a product's manufacturing and distribution supply chain history as transactions in the blockchain in a secure manner.

Management of supply chain data is useful for chronicling the history of a particular product and, in certain embodiments, the linking of an authenticated validator's review of the product to the product's specific supply chain. As noted, each entry associated with the chronicled history of the product can be embodied as a "transaction" of the blockchain. Blockchain technology can thus be used to securely maintain supply chain data as transactions (i.e., transaction data), which can be used as described herein to establish trust, accountability and transparency with regard to a product and its associated reviews.

Furthermore, as explained herein, illustrative embodiments provide a blockchain computational system for implementing the above and other management features wherein each computing node comprises controller modules for managing transaction data and blockchain computation. More particularly, one or more computing nodes in the system can be configured to track and detect product data.

As such, product transactions associated with a given stakeholder (someone or something that is associated with the given environment) are compiled into a chain of product transaction blocks. The chain can be considered a chronicle of the product's path through time. When a transaction is conducted, the corresponding product parameters are sent to one or more of the computing nodes in the system for validation. The one or more computing nodes establish a validity of the transaction and generate a new block. Once the new block has been calculated, it can be appended to the product's blockchain.

Aspects of an embodiment, or one or more features thereof discussed herein, can be configured as a modification of, or an enhancement to, a supply chain management system, with companion program code executing, for instance, in the supply chain management system itself, or a data processing system in communication with the supply chain management system. Data, such as transactions, can be provided by a variety of inputs, such as by sensors and other devices, that capture real-time data points along the supply chain. For instance, Internet of Things (IoT) enabled devices can be employed in various manufacturing machines, material storage, transport devices or vehicles, or locations along the supply chain, to sense a variety of parameters such as, motion or lack thereof, changes in weight or humidity, elapsed time during a motion or lack thereof, force applied, distance traveled, speed or velocity, and many other data points of a manufacturing or transport process. Other types of embedded sensors can also be used to collect and transmit supply-chain-related data.

Using a blockchain management system, an embodiment can construct a blockchain record from data point inputs obtained from any of the sources noted. The embodiment can identify a component or product at a particular point in the supply chain to which the data point relates. In one or more embodiments discussed herein, the record data, or blockchain record, can be processed using a cognitive engine, along with, for instance, natural language processing of third party review data related to the product to provide a user of the system with product-related guidance to assist the user in taking an action related to the product.

FIG. 3 depicts one embodiment of a data processing environment, or computing node, in which one or more aspects of illustrative embodiments can be implemented. FIG. 3 is only an example and is not intended to assert or imply any limitation with regard to the environments in which different aspects of embodiments can be implemented. A particular implementation can have many modifications to the depicted environment based on the description provided herein.

With reference to FIG. 3, a block diagram of a data processing system is shown in which one or more aspects of the present invention can be implemented. Data processing system 300 is an example of a computer, such as server, or other type of device, in which computer usable program code or instructions implementing one or more processes may be located for the illustrative embodiments.

As shown in FIG. 3, data processing system 300 includes, for instance, a computer system 302 shown, e.g., in the form of a general-purpose computing device. Computer system 302 can include, but is not limited to, one or more processors or processing units 304 (e.g., central processing units (CPUs)), a memory 306 (referred to as main memory or storage, as examples), and one or more input/output (I/O) interfaces 308, coupled to one another via one or more buses and/or other connections 310.

Processor 304 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 310 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 306 can include, for instance, a cache 320, such as a shared cache, which may be coupled to local caches 322 of processors 304. Further, memory 306 can include one or more programs or applications 330, an operating system 332, and one or more computer readable program instructions 334, as well as record data control code 336, review data authentication code 337, and recommendation engine code 338, implementing one or more aspects disclosed herein. Additionally, or alternatively, computer readable program instructions 334 can be configured to carry out one or more other functions of certain embodiments of the invention.

Computer system 302 can also communicate via, e.g., I/O interfaces 308 with one or more external devices 340, one or more network interfaces 342, and/or one or more data storage devices 344. Example external devices include a user terminal, a tape drive, a pointing device, a display, etc. Network interface 342 enables computer system 302 to communicate with one or more networks, such as a local area network (LAN), a general wide area network (WAN), and/or a public network (e.g., the Internet), providing communication with other computing devices or systems.

Data storage device 344 can store one or more programs 346, one or more computer readable program instructions 348, and/or data, etc. The computer readable program instructions can be configured to carry out functions of one or more aspects of the present invention.

Computer system 302 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 302. Examples, include, but are not limited to: microcode, device drivers, redundant processing units, external disk drive arrays, RAID systems, tape drives, and data archival storage systems, etc.

Computer system 302 can be operational with numerous other general purpose or special purpose computing system environments or configurations. Examples of well-known computing systems, environments, and/or configurations suitable for use with computer system 302 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and cloud computing environments that include any of the above systems or devices, and the like.

Note again that the depicted example of FIG. 3 is not meant to imply architectural limitations. Further, as noted, data processing system 300 of FIG. 3 could be, for instance, a server, workstation, tablet computer, laptop computer, or other computing device.

As discussed, as part of product manufacturing and distribution, the entities involved, including the manufacturer, can user or implement a management system which provides record data documenting, at least in part, a product's supply chain history. In one embodiment, a manufacturer can implement a blockchain-enabled, dynamic database, that tracks all components and materials used in a finished product. As the final product is assembled, each component specification and material sources are included as part of the record data for that product, such as based on a serial number or other unique product identifier. When the product changes hands to the distributor, and to the final purchaser, the ownership record for the product can be updated accordingly, however, the underlying blockchain-based record data for the product is immutable, and offers a transparent way for manufacturers, consumers, and even the original component company sourcing material or one or more sub-components to the product, to know with confidence which components are part of which end-user product.

Advantageously, when a consumer leaves a review (that is, provides review data), as a third party validator of a product, the review data will not be generic review data for a certain model of a product, but rather will be linked in accordance with the concepts disclosed herein directly to the actual blockchain record for that product that the reviewer purchased, which (in one embodiment) contains data on the respective components of the product and manufacturers thereof. By providing program code to validate the review data and link the validated review data to the actual record data documenting, at least in part, the product supply chain history, a system user is able to discern which suppliers or vendors were involved in the supply and assembly process, and/or other factors, such as quality characteristics of where product materials were sourced, mined, molded, etc., that contributed to the overall longevity or quality of the product, as documented by the verified review data. For instance, the manufacturer can determine whether materials supplied by one entity enhance product longevity or quality over materials supplied by another entity using the validated review data as feedback. With this granular analysis, companies can reverse-engineer the client or customer review data feedback to make better purchasing and manufacturing decisions, to enable higher quality product manufacturing, and thereby increase future customer satisfaction.

Advantageously, in one or more aspects, computer-implemented methods, system and computer program product are disclosed herein which provide validation of third party review data, and linking of the validated review data to record data documenting, at least in part, a product's actual supply chain, in order to enable iterative feedback into the supply chain, the manufacturing and assembly processes, that can result in variant categorization of completed products, that are ranked based on this consumer feedback loop. Identification of inflection points via inspection of the loop is then possible in order to dynamically provide guidance or recommendations using, for instance, predictive modeling, that pertain to variations in the processes and components, to maximize consumer and manufacturer satisfaction. Based on the provided guidance or recommendations, the system user can take action, or depending on the recommendation or guidance, the system itself can be configured to make a modification, such as a modification to the product's supply chain (e.g., to the product's manufacturing process).

Figure 4:
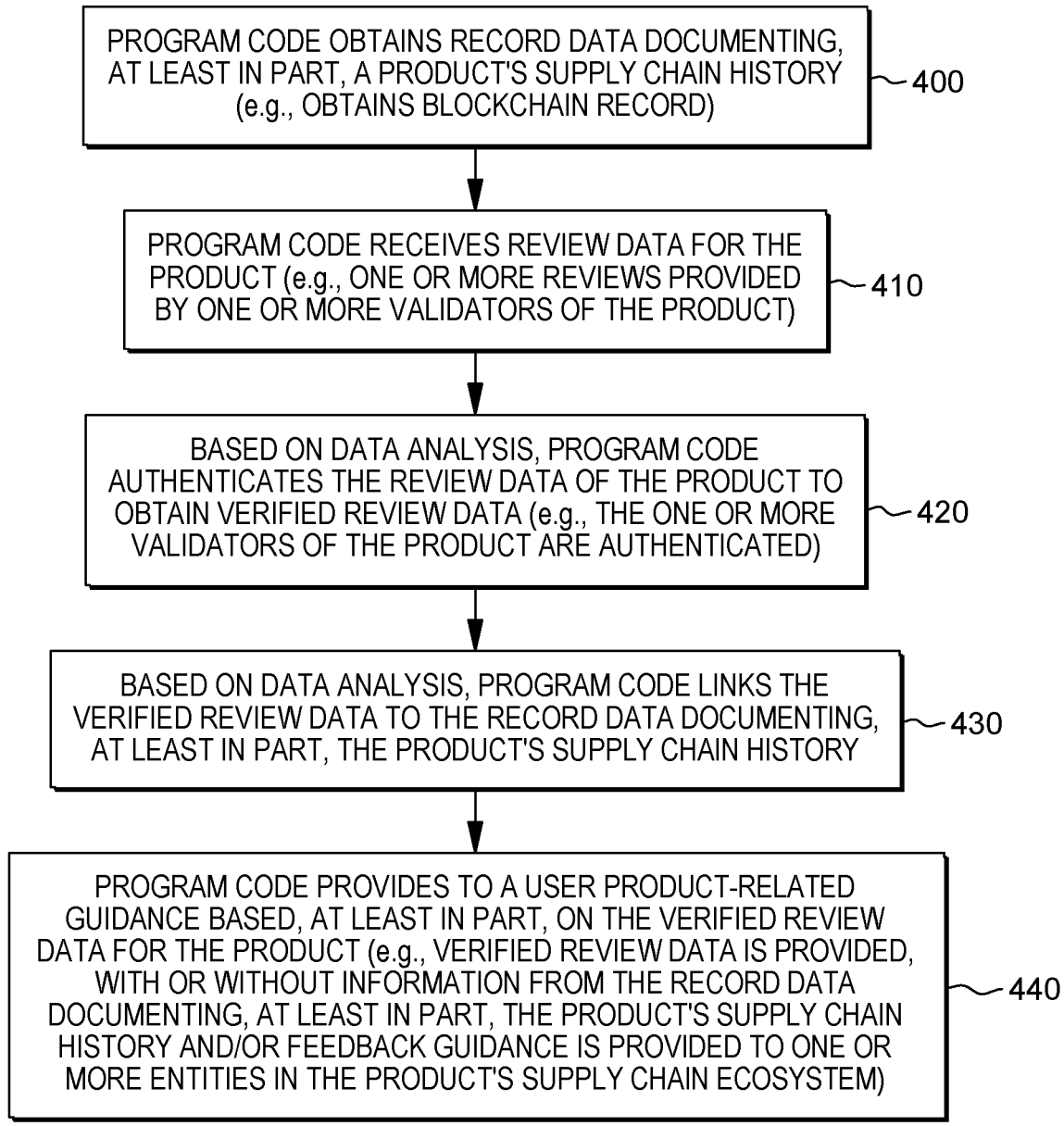
FIG. 4 depicts one embodiment of a workflow that illustrates certain aspects of some embodiments of the present invention.

By way of example, FIG. 4 illustrates one embodiment of a workflow implementing certain aspects of some embodiments of the present invention. As illustrated, program code executing on one or more processors obtains record data documenting, at least in part, a product's supply chain history 400. By way of example, the record data can be a blockchain record, as discussed herein. Program code executing on the one or more processors also receives review data for the product 410. The review data can be received from one or more validators of the product, such as one or more owners of the product. Based on data analysis, the program code executing on the one or more processors authenticates the review data of the product to obtain verified review data 420. For instance, in one or more embodiments, the program code authenticates one or more validators providing the review data for the product. In another embodiment, a uniform identifier provided with the product can be used to link the review data to the record data for the product. Further, based on data analysis, program code links the verified review data to the record data documenting, at least in part, the product's supply chain history 430. By way of example, the linking can be via a uniform identifier in one implementation, or in another implementation, the verified review data can become part of the record data, if desired. The program code provides to a user product-related guidance based, at least in part, on the verified review data for the product 440. For instance, the verified review data can be provided to a potential consumer as the product-related guidance, with or without information from the record data documenting, at least in part, the product's supply chain history. Alternatively, or additionally, the product-related guidance can be provided to one or more entities in the manufacturing supply chain ecosystem, including one or more recommendations generated by a recommendation engine, using the verified review data and the record data documenting, at least in part, the product's supply chain history.

Figure 5:
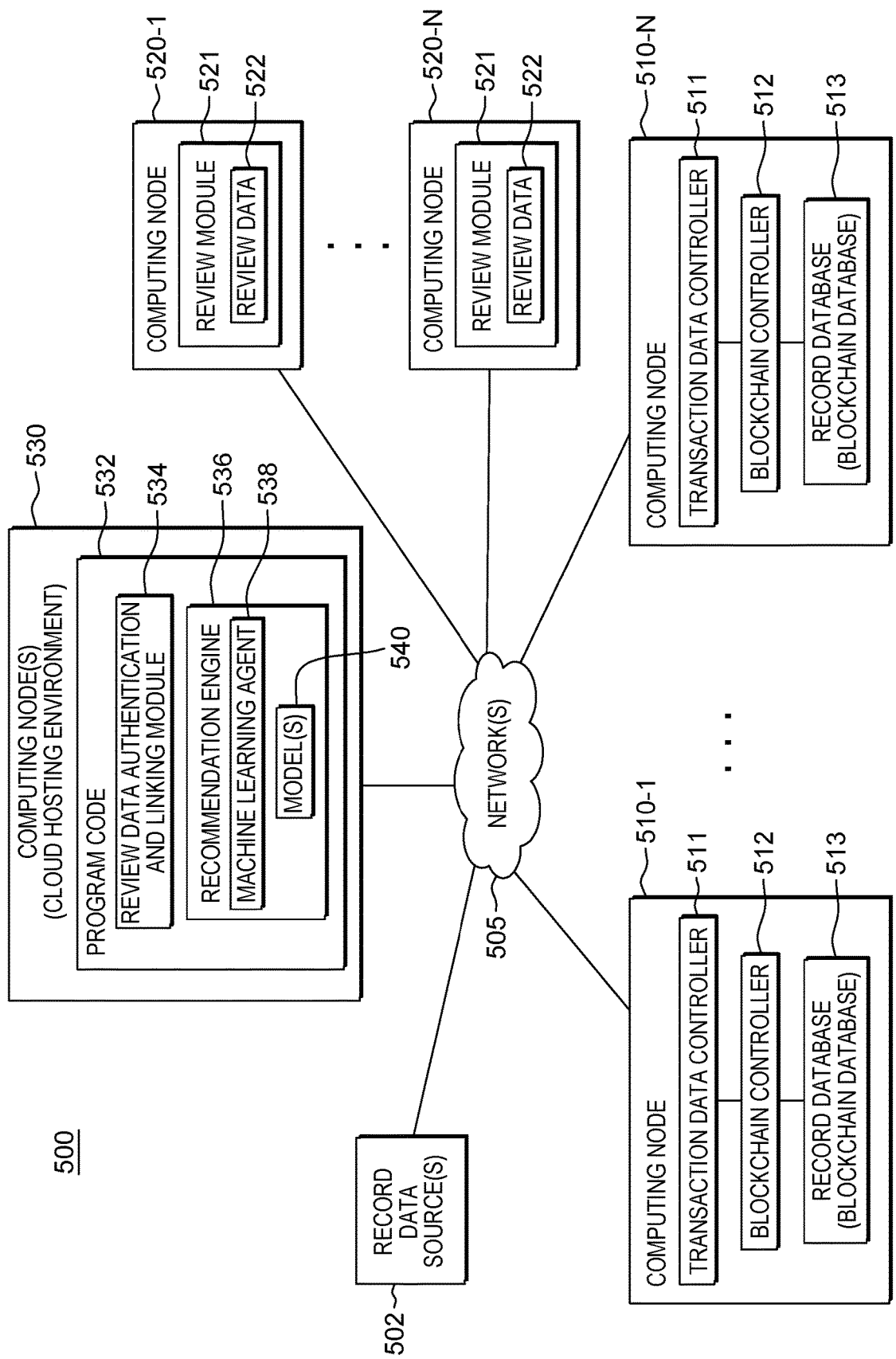
FIG. 5 depicts one embodiment of a system, illustrating certain aspects of an embodiment of the present invention.

FIG. 5 depicts an embodiment of a technical environment or system into which various aspects of some embodiments of the present invention can be implemented. By way of example, various computing nodes or systems can be provided and used, including computing nodes 510-1 . . . 510-N, computing nodes 520-1 . . . 520-N, and computing node(s) 530, such as a cloud-hosting environment. In the embodiment illustrated, computing node(s) 530 executes program code 532 implementing one or more aspects of the present invention including, for instance, a review data authentication and linking module 534, and a recommendation engine 536, which in one or more embodiments, uses a machine learning agent 538 and one or more models 540. Note that computing node(s) 530 of system 500 is shown in one embodiment as one or more computing resources of a cloud-hosting environment, by way of example only. Further, in one or more embodiments, review data authentication and linking module 534 and recommendation engine 536, including machine learning agent 538 and model(s) 540, can alternatively be implemented, in whole or in part, at one or more of computing nodes 510-1 . . . 510-N, and/or computing nodes 520-1 . . . 520-N.

As illustrated in FIG. 5, one or more record data sources 502, computing nodes 510-1 . . . 510-N, computing nodes 520-1 . . . 520-N, and computing node(s) 530, operatively couple to and communication via one or more networks 505. Network(s) 505 can be, for instance, a telecommunications network, a local-area network (LAN), a wide-area network (WAN), such as the Internet, or a combination thereof, and can include wired, wireless, fiber-optic connections, etc. The network(s) 505 can include one or more wired and/or wireless networks that are capable of receiving and transmitting data, including transactions, record data, review data, and product-related guidance, such as described herein.

System 500 illustrates, in part, one embodiment of a distributed computing platform on which a blockchain computational system (such as system 200 of FIG. 2) can be implemented. As shown, the distributed computing platform can include one or more data sources 502 that are operatively coupled to a plurality of computing nodes 510-1 . . . 510-N across one or more communications networks 505. By way of example only, each computing node 510-1 . . . 510-N can be configured to include a transaction data controller 511, a blockchain controller 512, and a data database or blockchain database 513. In one embodiment, transaction data controller 511 manages transaction data including, but not limited to, receiving or otherwise obtaining transaction data (identification data, use data, etc.), and blockchain controller 512 manages blockchain computation including, but not limited to, accessing the transaction data and generating and validating block, and adding the block to a blockchain, such as described above in connection with FIG. 2. Record database 513 maintains a copy of the current version of the blockchain database, in one embodiment.

In one implementation, data representing ID, location, use, as well as other data, with respect to a given product, such as the product's supply chain, is considered transaction data. Further, other non-limiting examples of transaction data include in-product sensor data and/or transport information, if desired. One skilled in the art will realize that other examples of transaction data related to a product, and in particular, related to the product's supply chain history, can be tracked and managed as part of the blockchain. Such transaction data is what is provided to any given computing node 510-1 . . . 510-N from data source(s) 502, or some other computing node, for use in computing a blockchain, for example, as described above in the context of FIG. 2. Transaction data controller 511 is configured to receive or otherwise obtain the transaction data for each computing node, while blockchain controller 512 is configured to compute the blockchain for each computing node. As discussed above in connection with FIG. 2, at least a portion of the computing nodes can be configured to participate in consensus protocol as peers (i.e., validating peers or validating nodes).

In one or more implementations, system 500 further includes one or more computing nodes 520-1 . . . 520-N, which can include a distributed network of one or more review or rating modules 521, which facilitate documenting review data 522 provided by one or more validators of a product. In one embodiment, each review module 521 can be located, for example, within a computer resource receiving an authenticated validator's review of a product, that is, receiving verified review data. Further, each review module 521 can be configured to reflect ratings, votes, comments, complaints, etc., regarding the product, which as described herein, can be linked to the blockchain database. Accordingly, the blockchain can include, or have associated therewith, an auditable trail of reviews, or review data.

Note also that a unique identifier (UID) or token for a product can be used to form a decentralized Internet of Things (IoT) instrument network, where devices of the network are "smart devices" that are connected to the blockchain through the corresponding UIDs or tokens. This can allow for enhanced supply chain tracking of products. Such an IoT instrument network can be used by the computing platform of system 500 depicted in FIG. 5. For instance, the items (in this case, product) can be tracked via data forwarded through network(s) 505, which operatively couples the computing nodes that store the blockchain, as well as the review data.

On top of providing trusted data, system 500 can provide for the implementation of various intelligent services, such as provided by review data authentication and linking module 534, and recommendation engine 536, which uses a machine learning agent 538 and one or more models 540. In the embodiment illustrated, program code 532 can be provided to execute on computing node(s) 530 which, for illustrative purposes only, is depicted as being separate from computing node(s) 510-1 . . . 510-N, and computing 520-2 . . . 520-N. This is a non-limiting example of an implementation. In one or more other implementations, computing resources on which one or more aspects of review data authentication and linking module 534 and recommendation engine 536 are implemented can, at least in part, be located within one or more of computing nodes 510-1 . . . 510-N and/or computing nodes 520-1 . . . 520-N. Further, in one or more embodiments, review modules 521 could be associated with computing nodes 510-1 . . . 510-N, if desired.

Briefly described, in one embodiment, computing nodes 510-1 . . . 510-N, 520-1 . . . 520-N and 530 can each include one or more processors, for instance, central processing units (CPUs). Also, the respective processor(s) can include functional components used in the integration of program code, such as functional components to fetch program code from locations such as cache or main memory, decode program code, and execute program code, access memory for instructions, and write results of the executed instructions or code. The processor(s) can also include a register(s) to be used by one or more of the functional components. In one or more embodiments, the computing resource(s) can include memory, input/output, a network interface, and storage, which can include and/or access one or more other computing resources and/or databases, as required to implement the inventive aspects described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or a local bus, using any of a variety of architectures. By way of example, and not limitation, such architectures can include the Industry Standard Architecture (ISA), the Micro-Channel Architecture (MCA), the Enhanced ISA (EISA), the Video Electronic Standard Association (VESA), local bus, and Peripheral Component Interconnect (PCI). Examples of a computing node or computer system which can implement one or more aspects disclosed herein are described further herein with reference to FIGS. 3, 10 & 11. Note also that, depending on the implementation, one or more aspects of each computing node can be associated with, licensed by, subscribed to by, etc., a company or organization, such as a company or organization manufacturing, providing, operating, etc., the product at issue.

As noted, program code 532 executing on computing node(s) 530 executes review data authentication and linking module 534, and in one embodiment, recommendation engine 536, which can include a machine learning agent 538 and model(s) 540, to provide recommendations to, for instance, a manufacturer or other supply chain entity based on data analysis of verified review data linked to the record data, such as the blockchain record. In one implementation, the review data authentication and linking module includes program code which obtains record data, such as a blockchain record, that documents, at least in part, a product's supply chain history, and receives review data, such as review data 522, for the product. Based on data analysis, review data authentication and linking module 534 authenticates the review data of the product to established verified review data. For instance, in one embodiment, the review data authentication and linking module 534 can authenticate a validator, such as an owner, providing the review data, and/or can verify the review data using a unique identifier associated with the product and provided with the review data. Review data authentication and linking module 534 further links the verified review data to the record data, such as by including the verified review data within the record data, or blockchain record, or maintaining the verified review data separate from the record data, but linked thereto via, for instance, a unique identifier. Further, the review data authentication and linking module 534 can include program code to provide to a user product-related guidance based, at least in part, on verified review data for the product that has been linked to the record data documenting the product's supply chain history, as described herein. Further, the verified review data linked to the record data can be used by recommendation engine 536 to provide feedback guidance to, for instance, a consumer and/or the product manufacturer specific to one or more aspects of the product's supply chain history.

Figure 6:
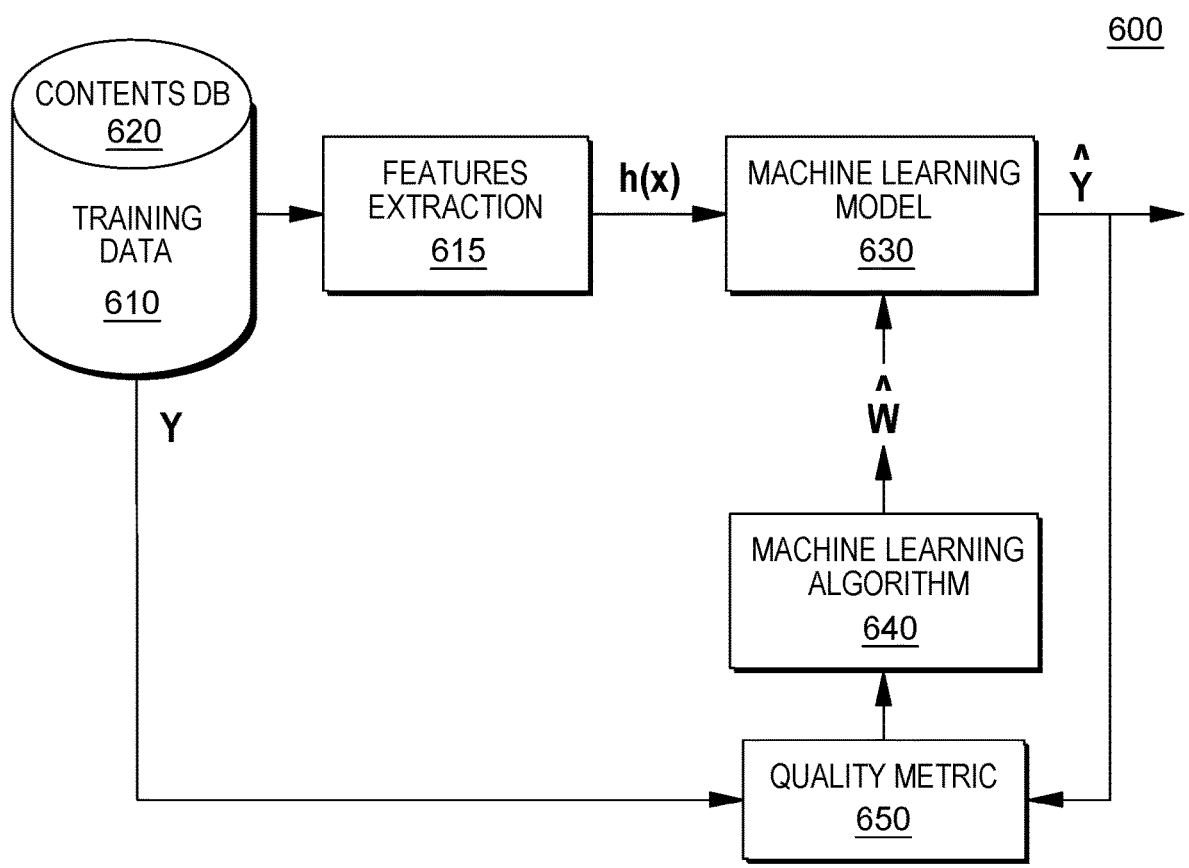
FIG. 6 illustrates various aspects of some embodiments of the present invention.

FIG. 6 is an example machine learning training system 600 that can be utilized to perform machine learning by the recommendation engine, such as described herein. Training data 610 used to train the model in embodiments of the present invention can include a variety of types of data, such as data generated by the data sources and/or computing nodes of the system. Program code, in embodiments of the present invention, can perform machine learning analysis to generate data structures, including modules or algorithms used by the program code to perform one or more aspects disclosed herein, including generating one or more recommendations to a supply chain entity based on validated review data. Machine learning (ML) solves problems that cannot be solved by numerical means alone. In this ML-based example, program code extracts various features/attributes from training data 610, which can be stored in memory or one or more databases 620. The extracted features 615 are utilized to develop a predictor function, h(x), also referred to as a hypothesis, which the program code utilizes as a machine learning model 630. In identifying machine learning model 630, various techniques can be used to select features (elements, patterns, attributes, etc.), including but not limited to, diffusion mapping, principle component analysis, recursive feature elimination (a brute force approach to selecting features), and/or a random forest, to select the attributes related to the verified review data, record data, and/or a particular recommendation. Program code can utilize a machine learning algorithm 640 to train machine learning model 630 (e.g., the algorithms utilized by the program code), including providing weights for conclusions or recommendations, so that the program code can train any predictor or performance functions included in the machine learning model 640, such as whether a particular component of a product relates to the verified review data being analyzed. The conclusions can be evaluated by a quality metric 650. By selecting a diverse set of training data 610, the program code trains the machine learning model(s) 640 to identify and weight various attributes (e.g., features, patterns) that correlate to enhanced performance of the machine learning agent implemented by the computing node. The model(s) 540 (FIG. 5) used by recommendation engine 536 can be self-learning, as program code updates the model based on additional review data received, as well as additional record data obtained. For instance, in some embodiments of the present invention, the program code executing on computing node(s) 530 can utilize existing machine learning analysis tools or agents to create, and tune, each respective model, based, for instance, on the verified review data, as well as the record data, for one or more products.

Some embodiments of the present invention can utilize IBM Watson® as learning agent. IBM Watson® is a register trademark of International Business Machines Corporation, Armonk, N.Y., USA. In embodiments of the present invention, the respective program code can interface with IBM Watson® application programing interfaces (APIs) to perform machine learning analysis of obtained data. In some embodiments of the present invention, the respective program code can interface with the application programming interfaces (APIs) that are part of a known machine learning agent, such as the IBM Watson® application programming interface (API), a product of International Business Machines Corporation, to determine impacts of data on an operational model, and to update the respective model, accordingly.

In some embodiments of the present invention, certain of the APIs of the IBM Watson® API include a machine learning agent (e.g., learning agent) that includes one or more programs including, but not limited to, natural language classifiers, Retrieve-and-Rank (i.e., a service available through IBM Watson® developer cloud that can surface the most relevant information from document data), concepts/visualization insights, trade-off analytics, document conversion, natural language processing, and/or relationship extraction. In an embodiment of the present invention, one or more programs can be provided to analyze data obtained by the program code across various sources utilizing one or more of, for instance, a natural language classifier, Retrieve-and-Rank APIs, and trade-off analytics APIs. In operation, the program code can collect and save machine-learned data used by the machine-learning agent.

In some embodiments of the present invention, the program code utilizes a neural network to analyze collected data, such as verified review data, relative to a product's supply chain history (i.e., the record data) to generate one or more models used by the recommendation engine. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision making tools). In general, program code utilizing neural networks can model complex relationships between inputs and outputs and identified patterns of data. Because of the speed and efficiency of neural networks, especially when parsing multiple complex data sets, neural networks and deep learning provide solutions to many problems in multi-source processing, which the programming code, in embodiments of the present invention, can accomplish to facilitate providing, for instance, product-related guidance, such as one or more recommendations, to a consumer, and/or to one or more entities associated with a product's supply chain history.

Figure 7:
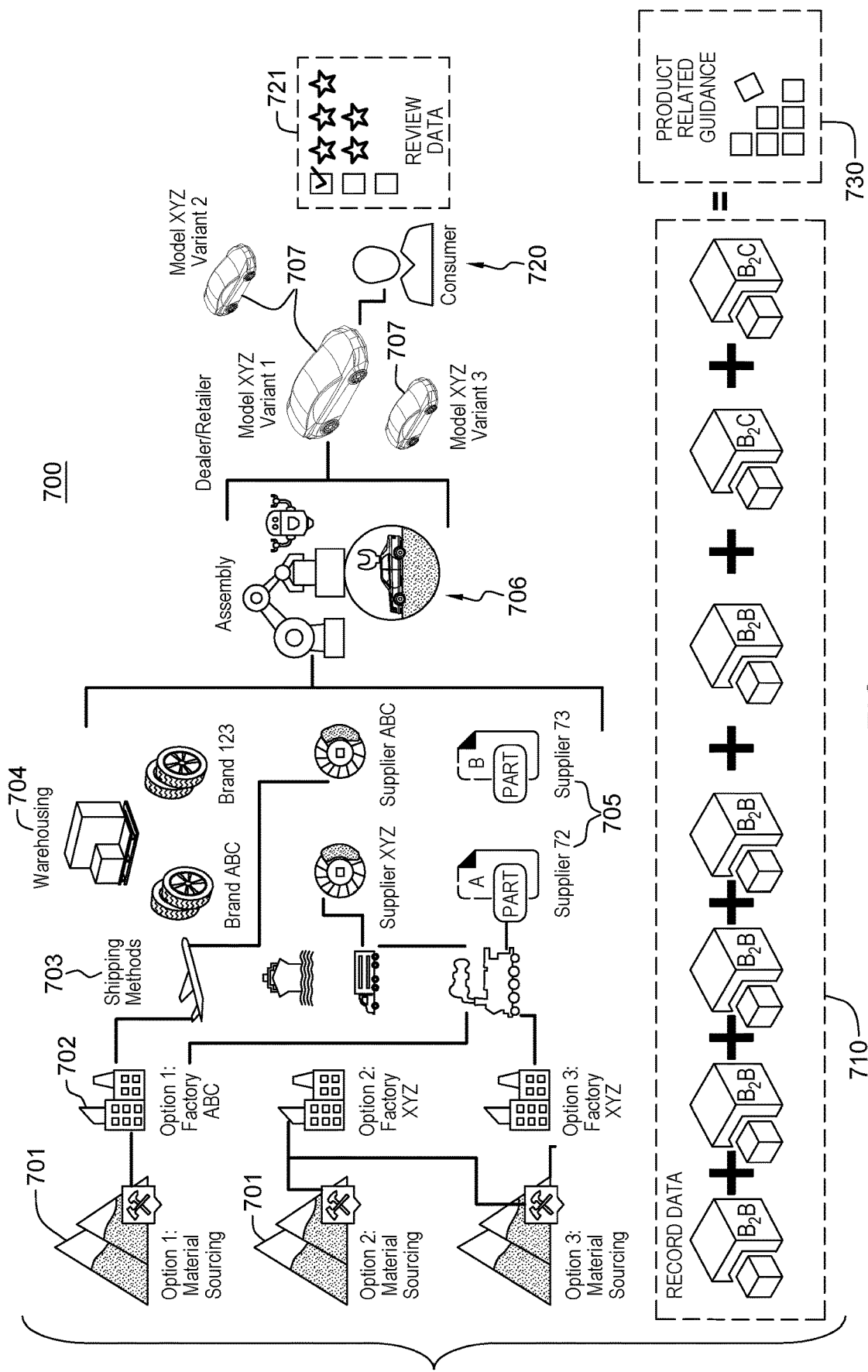
FIG. 7 illustrates another embodiment of a product supply chain and computing a record, such as a blockchain record, for the product's supply chain history, for use in accordance with one or more aspects of the present invention.

FIG. 7 illustrates another embodiment of a product supply chain 700, with associated record data 730 and review data 721 to be linked and form the basis for product-related guidance, in accordance with one or more aspects disclosed herein.

As illustrated in FIG. 7, a large number of entities and stages can be part of a product's supply chain, including multiple options for material sourcing 701, multiple options for component fabrication in different manufacturing factories 702, multiple shipping methods 703, multiple warehousing 704 and supplier 705 options, as well as the manufacturer or assembly entity 706, which provides to a dealer or retailer one or more variations of the product 707. A consumer 720 of one of those variations 702 can provide review data 721 which is linked, as described herein, to the particular record data 710 (e.g., or blockchain record) established for the product's supply chain. Based on the linked review data 721 and record data 710, the system can provide product-related guidance 730, such as one or more recommendations, to another potential consumer and/or to one or more entities in the supply chain ecosystem for the product.

As illustrated in FIG. 7, in one implementation, the blockchain record 710 can include transaction data that is both business-to-business ($B_2B$) data for the product, as well as business-to-consumer ($B_2C$) data, such as ownership information and/or verified review data. As illustrated in FIG. 7, the final product might be product XYZ in marketing and packaging, but due to supplier, vendor and process differences, there are actually multiple variants in the product model XYZ when analyzed down to the granular components and processes throughout the supply chain ecosystem. As illustrated, there are thus actually different variants of the product model. Advantageously, the data-analysis-based validation of product review data and linking to the actual supply chain record data for the product, such as disclosed herein, accounts for these variants in providing information and making recommendations to a user of the system that is trusted and specific to the product at issue.

Figure 8A:
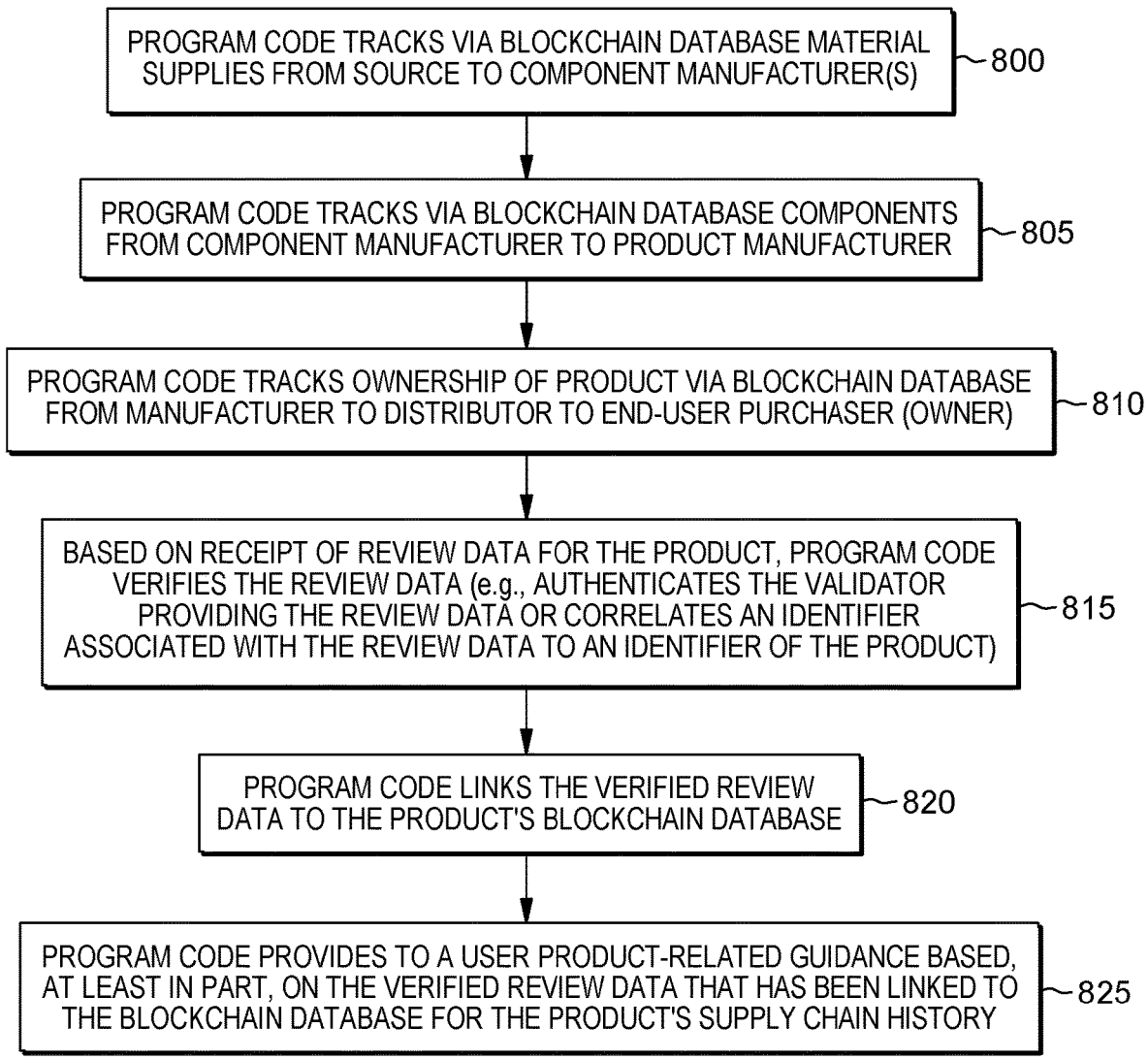
FIGS. 8A-8C depict another embodiment of workflows that illustrate certain aspects of some embodiments of the present invention.
Figure 8B:
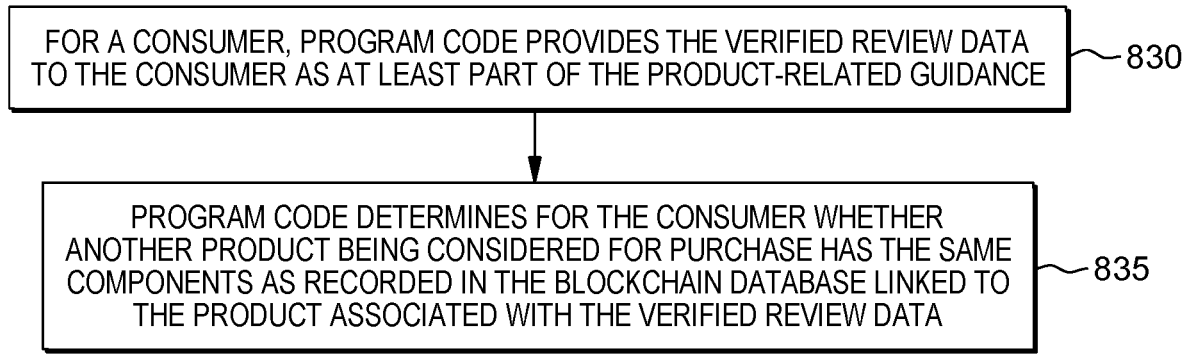
Figure 8C:
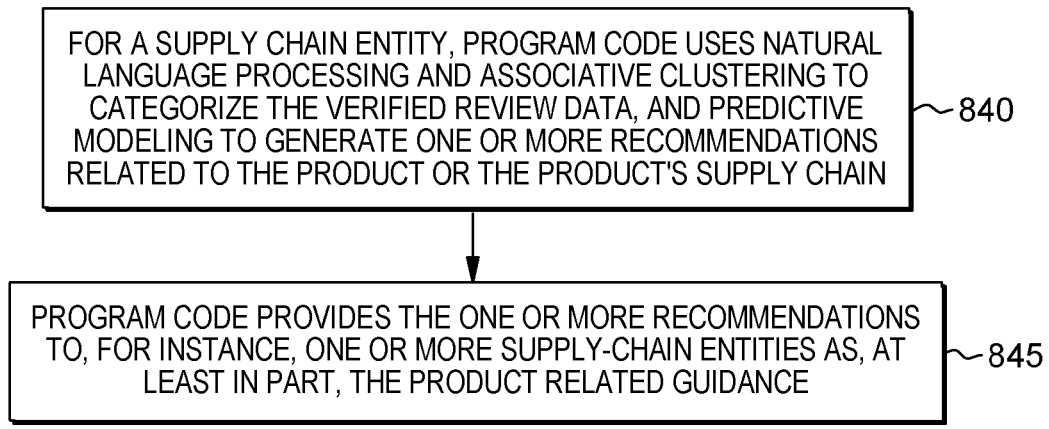

FIGS. 8A-8C depict another embodiment of workflows that illustrate some aspects of some embodiments of the present invention.

As illustrated in FIG. 8A, in one or more embodiments, program code tracks, via a blockchain database, material supplies from source to the point of manufacture(s) 800. For instance, raw material supplies can be tracked via the blockchain database from the original source to the point of manufacture(s) with unique identifiers (UIDs) for: L[ ]: location, Timestamp[ ]: date sourced, and related metadata.

Further, program code can track via blockchain database components from component manufacture(s) to product manufacture(s) 805. For instance, as materials are used in manufactured components, the database record for each component can reference the particular raw material sources for that component. As components are used in the manufactured final product, the database record for each final product can be updated to reference each particular maker of each component, as well as to allow data access down to the raw materials used, as mentioned above. By way of example only, program code to construct a block for the blockchain with this information as part of assembling the record data might be:

```
const block={
'index': 1,
'timestamp' 1506057125.900785,
'transactions': [
  {
    'sender': "8527147fe1f5426f9dd545de4b27ee00",
    'recipient': "a77f5cdfa2934df3954a5c7c7da5df1f",
    'amount': 5,
    'component': C
    'product feature': Pf
    'review': NLP/Gaussian O/P
  }
],
'proof': 324984774000,
'previous_hash':
"2cf24dba5fb0a30e26e83b2ac5b9e29e1b161e5c1fa7425e74043362938b9824"
}
newTransaction
(sender,
recipient,
amount,
component,
product feature,
review) {
this.current_transaction.push({
sender: sender,
recipient: recipient,
amount: amount
component: component
product feature: feature
review: review
})
return this.lastBlock( )['index']+1
}
```

As illustrated in FIG. 8A, in one or more embodiments, program code can track ownership of the product via the blockchain database from manufacturer, to distributor, to end-user or purchaser (i.e., owner) 810. For instance, as a product changes hands from the manufacturer to the distributor and finally to the purchaser, the ownership of the final product can be tracked in a data structure, such as part of the blockchain database, or separate, and can be updated to reflect, in addition to the current ownership information, the particular blockchain database record, which contains information on all the components in the product, as described herein.

Based on receipt of review data for the product, program code verifies the review data 815. For instance, the program code can authenticate a validator providing the review data, or correlate an identifier associated with the review data to an identifier associated with the product. In particular, in one embodiment, when a review is left or posted for a product, the reviewer is able to authenticate themselves as owner of the product that they are leaving the review for. This authentication process advantageously prevents spammed versions being left by non-product owners or automated part or product reviews by bots.

Based on data analysis, program code links the verified review data to the product's blockchain record 820. Thus, when a review is left, rather than being a generic review for a generic product of a certain model, the review will reference the exact product record that includes the product's supply chain history, which identifies (for instance)

specific components used within the product, as well as manufacturing process details. This linking enables more granular consideration of positive and negative review data with reference to a product's supply chain, and the correlation between the particular components of the product and the review data.

Program code then provides to a user product-related guidance based, at least in part, on the verified review data that has been linked to the blockchain database for the product's supply chain history 825.

In one or more embodiments, the product-related guidance can vary, depending upon the system user. For instance, where the user is a consumer, then as illustrated in FIG. 8B, the program code can provide the verified review data to the consumer as part of the product-related guidance 830. In addition, program code can optionally determine for the consumer whether another product being considered for purchase by the consumer has the same components as recorded in the blockchain database linked to the product associated with the verified review data 835. In this manner, the consumer is provided with verified reviews for the particular product, model, component, being considered for purchase, and has confidence that the particular product, model, component being considered is identical to the product associated with the verified review data. In this regard, the program code can be provided with access to the blockchain record of the particular product, model, component, being considered for purchase, which is in addition to the blockchain record of the product associated with the verified review data. Further, the program code can identify one or more differences between the product associated with the verified review data, and the product being considered for purchase, and provide information to the consumer identifying those one or more differences, such as one or more supply chain differences or component differences in the history of the two products.

For a system user that is a supply chain entity, program code can use natural language processing and associated clustering to categorize the verified review data, and predictive modeling to generate one or more recommendations related to the product's supply chain 840, as illustrated in FIG. 8C. The generated recommendations can be provided by the program code to the one or more supply chain entities as, at least in part, product-related guidance 845, which can then be implemented by the supply chain entity. For instance, in one or more embodiments, based on the product-related guidance, one or more supply chain entities can change a component supplier, change a component in the product, change a manufacturing process, a transport process, etc., in the product's supply chain.

By way of example, a Bag of Words NLP algorithm can be applied to the review data, and an associated clustering model used to congregate the review data to the blockchain node network, with the component or product identified, and a Naïve Bayes classifier can be used by the program code for prediction analysis of similar components existing in the framework. For instance, applying NLP-based analysis can be applied to product review data and product specifications to identify a particular component used in various models of a product, even where the products are not necessarily the same or the same model, or can have different variations of product components. Associating the verified review data with variations in the model components, as well as variations in the manufacturing pipeline, can be accomplished by associative clustering, natural language processing, keywords identification, etc., which can be used to cluster different items, components, products, based on associative clustering, and then predict impact on other similar items based on commonalities and specifications, one embodiment of which is described further below with reference to FIG. 9. By way of example only, the below program code might be used in one embodiment:

```
for i in range(0,1000):
    review=re.sub('[^a-zA-Z]', ' ', dataset['Review'][i])
    review=review.lower( )
    review=review.split( )
        ps=PorterStemmer( )
        review=[ps.stem(word) for word in view if not word in
            set(stopwords.words('english'))]
    review=' '.join(review)
    corpus.append(review)
# Creating the Bag of Words model
from sklearn.feature_extraction.text import CountVectorizer
cv=CountVectorizer(max_features=1500)
X=cv.fit_transform(corpus).toarray( )
y=dataset.iloc[:, 1].values
# Splitting the dataset into the Training set and Test set
from sklearn.cross_validation import train_test_split
X_train, X_test, y_train, y_test=train_test_split(X, y,
    test_size=0.20 random_state=0)
# Fitting Naïve Bayes to the Training set
from sklearn.naive_bayes import GaussianNB
classifier=GaussianGB( )
classifier.fit(X_train, y_train)
# Predicting the Test set results
y_pred=classifier.predict(X_test)
```

In one or more embodiments, recommendation engine test results can be fed to the computing node(s) with the record data for a particular component, with the information being presented to a system user in a verified format.

Those skilled in the art will note from the above description that the data-analysis-based validation of product review data and linking to supply chain record data can be used herein to provide a variety of product-related guidance, depending on the system user, and based thereon, for a variety of actions to be taken. For instance, when a consumer wishes to purchase an item based on one or more reviews, the consumer, using the system/processing disclosed herein, is able to independently verify that a product to be purchased does indeed contain the same components as the one that the review was written for, providing the consumer with a much higher level of confidence in the review data. In another embodiment, the review data can be collected as feedback, categorized as described herein, and a set of actionable recommendations can be generated by the recommendation engine for presentation to a company or manufacturer, such as a company or manufacturer in the supply chain ecosystem, to better refine their manufacturing process and/or product, and to obtain a more consumer-friendly outcome.

Figure 9:
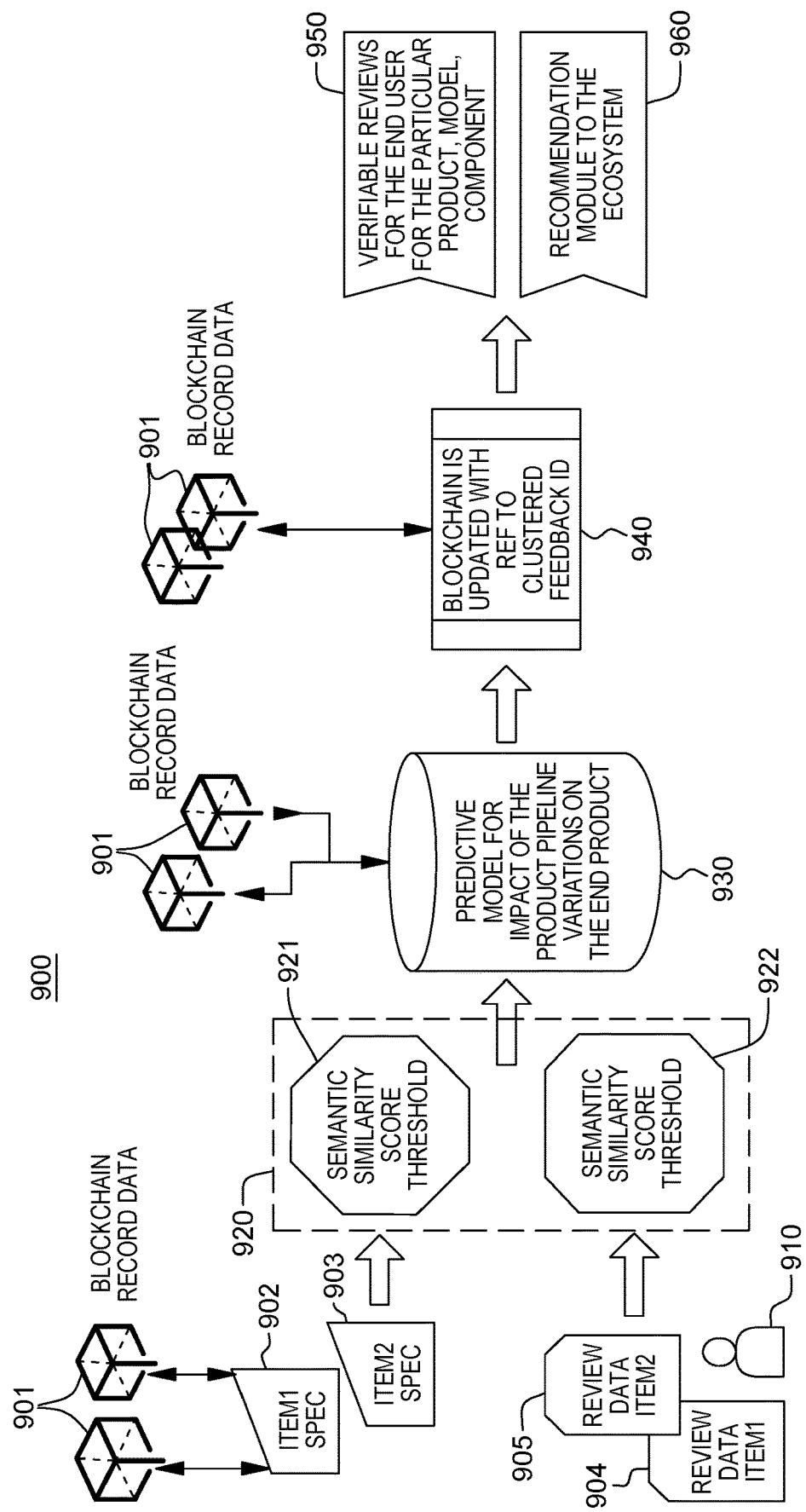
FIG. 9 depicts a further embodiment of a workflow that illustrates various aspects of some embodiments of the present invention.

FIG. 9 depicts a further embodiment of a workflow that illustrates various aspects of some embodiments of the present invention. In FIG. 9, respective specification data for two different products, ITEM1 902 and ITEM2 903, is obtained, for instance, from the product's associated blockchain record data 901. The products can be, for instance, different products of the same model product, or different models, or different types of products completely, which may use one or more common components within the products. Review data for ITEM1 904 and review data for ITEM2 905 is received by the system from one or more third party validators 910, such as one or more consumers of the ITEM1 product and the ITEM2 product.

In one or more implementations, the recommendation engine uses natural language processing and AI clustering techniques to evaluate semantic similarities and compare the semantic similarities to one or more threshold scores 920. For instance, semantic similarity between ITEM1 specification 902 and ITEM2 specification 903 can be evaluated and compared against one or more thresholds to cluster the items together, for instance, based on the items being a similar model item, or having one or more common components, or other commonality in their specification. In one or more embodiments, the semantic similarity between the product review data 904, 905 for the different items is compared to one or more thresholds to cluster the reviews (i.e., feedback) for those items 922. For instance, in one embodiment, the system clusters the ITEM1 and ITEM2 products together based on natural language processing of the associated specifications, and then clusters the feedback for those items together as appropriate to provide data to a predictive model for, for instance, evaluating impact of product pipeline variations on the end product 930. This use of a predictive model 930 can also reference the associated blockchain record data 901 for the products documenting, at least in part, the respective supply chain histories.

In the embodiment illustrated, the respective blockchains is updated with reference to the clustered feedback data, or clustered feedback identification 940, and product-related guidance is provided by the system to one or more users. For instance, where the user is a consumer, verifiable reviews for the end-user for the particular product, model, component, etc., are provided 950. Where the user is a supply chain entity, such as a manufacturer, one or more recommendations are provided to the supply chain ecosystem entity 960. Based on the verified reviews and the granularity of the supply chain data available, the user then takes action to, for instance, purchase a related product, decide not to purchase a related product, or make an adjustment to the supply chain or manufacturing process to improve future reviews of the product, etc.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server such as the one depicted in FIG. 3. Computer system/server 302 of FIG. 3 can be practiced and distributed in cloud computing environments where tasks are performed by remote processing devices that are linked through a communications network. In a distributed cloud computing environment, program modules can be located in both local and remote computer system storage media, including memory storage devices. Computer system/server 302 is capable of being implemented to perform the functionality set forth herein.

Figure 10:
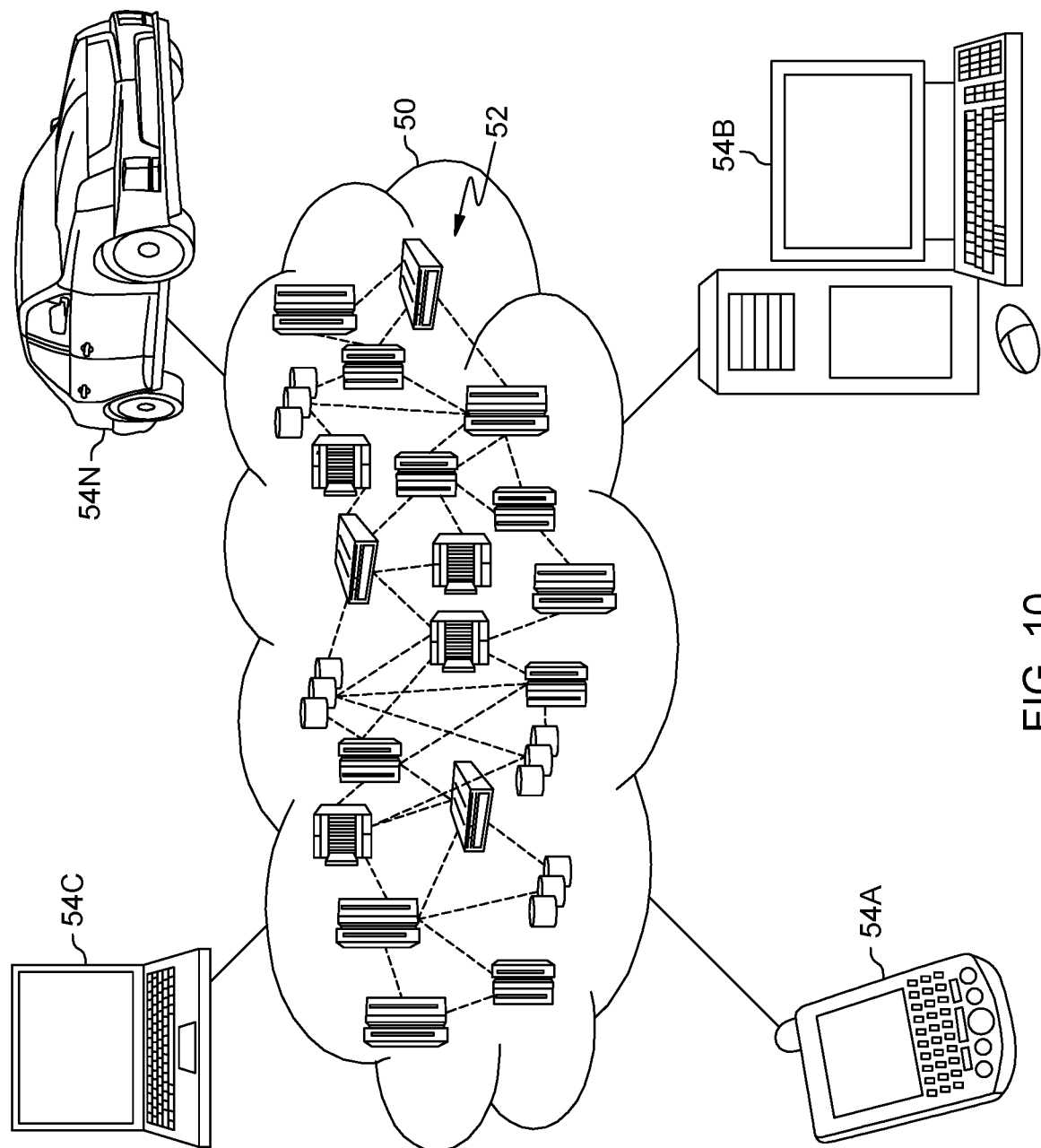
FIG. 10 depicts an embodiment of a cloud computing environment which can facilitate implementing, or be used in association with, certain aspects of an embodiment of the present invention.

Referring now to FIG. 10, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
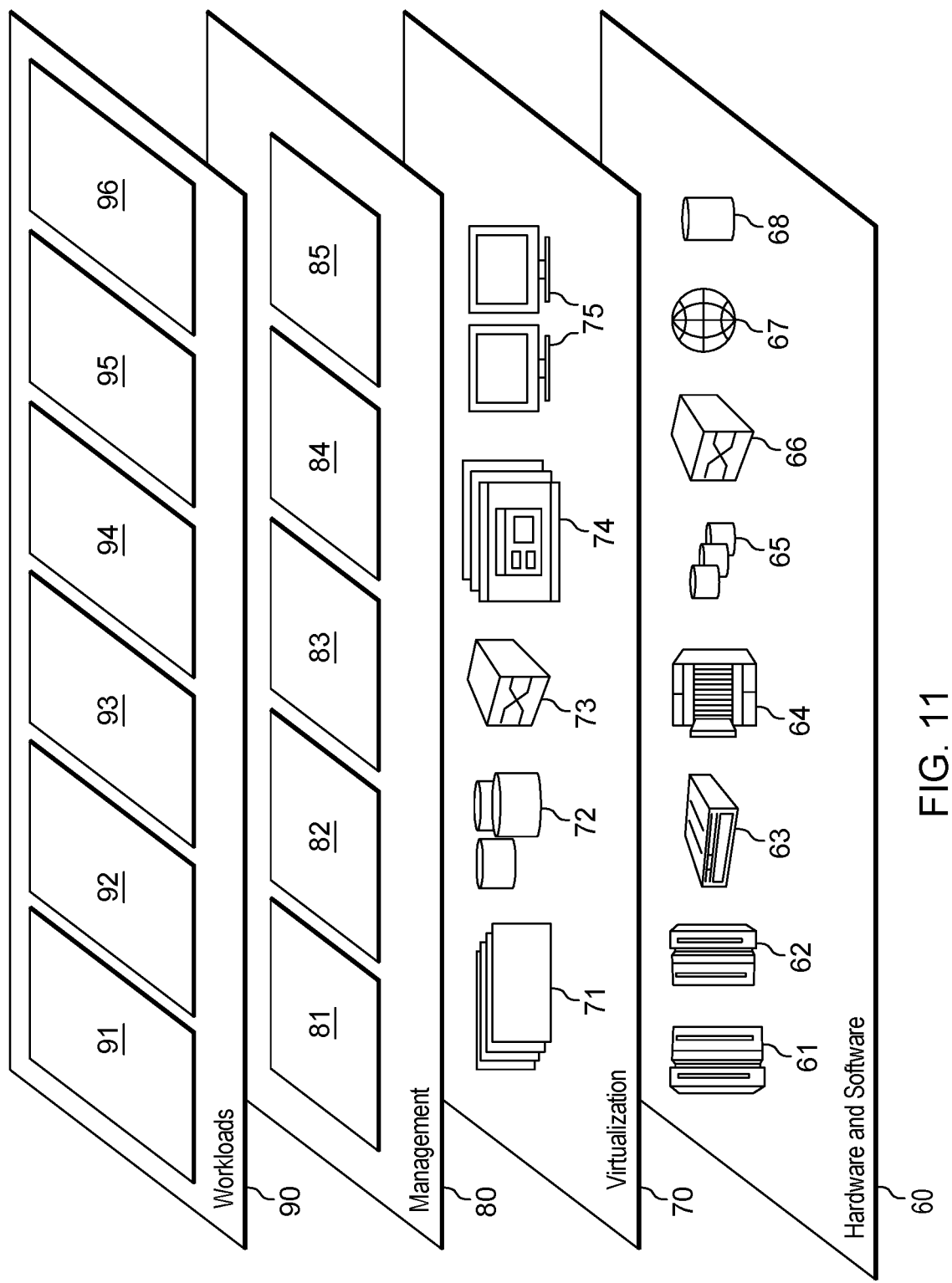
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided.

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and review data authentication and linking module processing and/or recommendation engine processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It is noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of devices and/or tracking components may be used in one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
   obtaining, by one or more processors, a digital blockchain record documenting, at least in part, a product's supply chain history, the digital blockchain record being maintained by a blockchain system;
   receiving, by the one or more processors, digital review data for the product;
   data-analysis-based authenticating, by the one or more processors, the digital review data of the product to establish verified review data;
   data-analysis-based linking, by the one or more processors, the verified review data to the digital blockchain record to produce a linked digital record documenting, at least in part, the product's supply chain history and the linked, verified review data; and
   providing to a user, by the one or more processors, product-related guidance based, at least in part, on the linked digital record documenting, at least in part, the product's supply chain history and the linked, verified review data.

2. The computer-implemented method of claim 1, further comprising:
   receiving, by the one or more processors, other record data documenting, at least in part, another product's supply chain history, where the product and the other product are a same type of product;
   comparing, by the one or more processors, the digital blockchain record of the product and the other record data of the other product to confirm that the product and the other product contain identical components; and
   providing to the user, by the one or more processors, an indication that the product and the other product contain the identical components.

3. The computer-implemented method of claim 1, further comprising:
   receiving, by the one or more processors, other record data documenting, at least in part, another product's supply chain history, where the product and the other product are a same type of product;
   comparing, by the one or more processors, the digital blockchain record of the product and the other record data of the other product to identify one or more supply chain differences between the product and the other product; and
   providing, by the one or more processors, the supply chain difference(s) to the user.

4. The computer-implemented method of claim 3, wherein the one or more supply chain differences between the product and the other product comprise one or more component differences between the product and the other product, where the product and the other product each comprise multiple components.

5. The computer-implemented method of claim 1, wherein the digital blockchain record comprises product component details, and the method further comprises analyzing, by the one or more processors, the verified review data using natural language processing to identify based thereon a component of the product relevant, at least in part, to the verified review data, and wherein the providing includes indicating to the user the identified component of the product relevant to the verified review data.

6. The computer-implemented method of claim 5, further comprising:
   receiving, by the one or more processors, other record data documenting, at least in part, another product's supply chain history, where the product and the other product are different types of products;
   comparing, by the one or more processors, the digital blockchain record of the product and the other record data of the other product to confirm that the identified component is common between the product and the other product; and
   providing to the user, by the one or more processors, an indication that the identified component is common between the product and the other product.

7. The computer-implemented method of claim 1, wherein the user is a manufacturer of the product, and the verified review data is provided by an end-user of the product, and wherein the providing includes parsing, by the one or more processors, the verified review data using natural language processing and generating based thereon feedback guidance to the manufacturer specific to one or more aspects of the product's supply chain history.

8. The computer-implemented method of claim 7, wherein the feedback guidance comprises one or more machine learning recommendations to the manufacturer pertaining the product's supply chain, the one or more recommendations being based, at least in part, on the verified review data for the product.

9. The computer-implemented method of claim 1, wherein the digital blockchain record comprises ownership data for the product, and the authenticating comprises comparing identity data of a validator providing the review data to the ownership data for the product to authenticate the validator, and thereby verify the review data.

10. A system comprising:
a memory;
one or more processors in communication with the memory; and
program instructions executable by the one or more processors via the memory to perform a method comprising:
obtaining, by one or more processors, a digital blockchain record documenting, at least in part, a product's supply chain history, the digital blockchain record being maintained by a blockchain system;
receiving, by the one or more processors, digital review data for the product;
data-analysis-based authenticating, by the one or more processors, the digital review data of the product to establish verified review data;
data-analysis-based linking, by the one or more processors, the verified review data to the digital blockchain record to produce a linked digital record documenting, at least in part, the product's supply chain history and the linked, verified review data; and
providing to a user, by the one or more processors, product-related guidance based, at least in part, on the linked digital record documenting, at least in part, the product's supply chain history and the linked, verified review data.

11. The system of claim 10, wherein the record data includes a blockchain record documenting, at least in part, the product's supply chain history, and wherein the method further comprises:
receiving, by the one or more processors, other record data documenting, at least in part, another product's supply chain history, where the product and the other product are a same type of product;
comparing, by the one or more processors, the digital blockchain record of the product and the other record data of the other product to confirm that the product and the other product contain identical components; and
providing to the user, by the one or more processors, an indication that the product and the other product contain the identical components.

12. The system of claim 10, wherein the method further comprises:
receiving, by the one or more processors, other record data documenting, at least in part, another product's supply chain history, where the product and the other product are a same type of product;
comparing, by the one or more processors, the digital blockchain record of the product and the other record data of the other product to identify one or more supply chain differences between the product and the other product; and
providing, by the one or more processors, the supply chain difference(s) to the user.

13. The system of claim 10, wherein the digital blockchain record comprises product component details, and wherein the method further comprises analyzing, by the one or more processors, the verified review data using natural language processing to identify based thereon a component of the product relevant, at least in part, to the verified review data, and wherein the providing includes indicating to the user the identified component of the product relevant to the verified review data.

14. The system of claim 13, further comprising:
receiving, by the one or more processors, other record data documenting, at least in part, another product's supply chain history, where the product and the other product are different types of products;
comparing, by the one or more processors, the digital blockchain record of the product and the other record data of the other product to confirm that the identified component is common between the product and the other product; and
providing to the user, by the one or more processors, an indication that the identified component is common between the product and the other product.

15. The system of claim 10, wherein the user is a manufacturer of the product, and the verified review data is provided by an end-user of the product, where the providing includes parsing, by the one or more processors, the verified review data using natural language processing and generating based thereon feedback guidance to the manufacturer specific to one or more aspects of the product's supply chain history.

16. The system of claim 15, wherein the feedback guidance comprises one or more machine learning recommendations to the manufacturer pertaining the product's supply chain, the one or more recommendations being based, at least in part, on the verified review data for the product.

17. A computer program product comprising:
a computer-readable storage medium having computer-readable code embodied therein, the computer-readable code being executable by one or more processors to cause the one or more processors to:
obtain, by one or more processors, a digital blockchain record documenting, at least in part, a product's supply chain history, the digital blockchain record being maintained by a blockchain system;
receive, by the one or more processors, digital review data for the product;
data-analysis-based authenticate, by the one or more processors, the digital review data of the product to establish verified review data;
data-analysis-based link, by the one or more processors, the verified review data to the digital blockchain record to produce a linked digital record documenting, at least in part, the product's supply chain history and the linked, verified review data; and
provide to a user, by the one or more processors, product-related guidance based, at least in part, on the linked digital record documenting, at least in part, the product's supply chain history and the linked, verified review data.

18. The computer program product of claim 17, wherein the computer-readable code is executable by the one or more processors to further cause the one or more processors to:
receive, by the one or more processors, other record data documenting, at least in part, another product's supply chain history, where the product and the other product are a same type of product;
compare, by the one or more processors, the digital blockchain record of the product and the other record data of the other product to confirm that the product and the other product contain identical components; and
provide to the user, by the one or more processors, an indication that the product and the other product contain the identical components.

19. The computer program product of claim 17, wherein the user is a manufacturer of the product, and the verified review data is provided by an end-user of the product, and wherein the providing includes parsing, by the one or more processors, the verified review data using natural language processing and generating based thereon feedback guidance to the manufacturer specific to one or more aspects of the product's supply chain history.

\* \* \* \* \*